(12) United States Patent
Posselius et al.

(10) Patent No.: US 10,058,038 B2
(45) Date of Patent: Aug. 28, 2018

(54) SYSTEM AND METHOD FOR CONTINUOUS BALE FORMING

(71) Applicant: CNH Industrial America LLC, New Holland, PA (US)

(72) Inventors: John Posselius, Ephrata, PA (US); John D. Gardus, Allentown, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/216,025

(22) Filed: Jul. 21, 2016

(65) Prior Publication Data
US 2017/0164561 A1 Jun. 15, 2017

Related U.S. Application Data (60) Provisional application No. 62/165,486, filed on May 22, 2015.

(51) Int. Cl.
*A01F 15/10* (2006.01)
*A01F 15/04* (2006.01)

(52) U.S. Cl.
CPC ............ *A01F 15/10* (2013.01); *A01F 15/042* (2013.01)

(58) Field of Classification Search
CPC .. A01F 15/10; A01F 15/04; A01F 2015/0775; A01F 15/042; A01D 89/00
USPC .......................................................... 56/341
See application file for complete search history.

(56) References Cited

U.S. PATENT DOCUMENTS

| | | | | |
|---|---|---|---|---|
| 2,696,777 | A * | 12/1954 | Sutch | A01F 15/07 100/11 |
| 3,044,391 | A * | 7/1962 | Pellett | A01F 15/00 100/148 |
| 3,063,361 | A * | 11/1962 | Gehrke | B30B 11/227 100/139 |
| 3,279,396 | A * | 10/1966 | Soteropulos | B30B 11/205 100/904 |
| 4,553,378 | A * | 11/1985 | Fachini | A01D 46/084 100/100 |
| 5,009,062 | A * | 4/1991 | Urich | A01F 15/00 100/100 |
| 5,377,481 | A * | 1/1995 | Sibley | A01F 15/00 100/145 |
| 5,535,669 | A * | 7/1996 | Sibley | A01F 15/00 100/145 |
| 6,000,206 | A | 12/1999 | Case et al. | |
| 6,186,060 | B1 * | 2/2001 | Peterson | A01F 15/00 100/138 |
| 6,295,797 | B1 | 10/2001 | Naaktgeboren et al. | |

(Continued)

*Primary Examiner* — John Weiss
(74) *Attorney, Agent, or Firm* — Patrick M. Sheldrake (57) ABSTRACT

A crop feeding mechanism for a harvester includes one or a plurality of screws or augers positioned in a hollow chamber of defined by the interior surface of an elongated frame, whereby the interior surface is tapered with decreasing volume in it rear portion. The one or a plurality of screws or augers are affixed upon a rotating axis and, as crop material is fed into the chamber, the one or a plurality of screws or augers conveys crop material rearward toward the tapered end and compact the crop materials so that the compacted crop material is extruded out of an opening at the rear end at a rate and temperature and in a form sufficient to allow a net wrap mechanism positioned at or near the opening to wrap the crop into a bale.

19 Claims, 5 Drawing Sheets

(56) References Cited

U.S. PATENT DOCUMENTS

| | | | |
|---|---|---|---|
| 6,644,006 B1 | 11/2003 | Merritt et al. | |
| 6,651,416 B2 | 11/2003 | Trelstad et al. | |
| 6,688,092 B2 | 2/2004 | Anstey et al. | |
| 6,840,023 B2 | 1/2005 | Roth et al. | |
| 6,877,304 B1 | 4/2005 | Smith et al. | |
| 7,290,485 B2 * | 11/2007 | Schlesser | A01D 89/006 100/74 |
| 8,539,787 B2 | 9/2013 | Ebigt et al. | |
| 8,770,102 B2 | 7/2014 | Verhaeghe et al. | |
| 9,642,311 B2 * | 5/2017 | Posselius | A01F 15/10 |
| 2014/0261023 A1 * | 9/2014 | Smith | A01F 15/0833 100/40 |
| 2017/0156268 A1 * | 6/2017 | Schrag | A01F 15/0825 |
| 2018/0084730 A1 * | 3/2018 | Younk | A01F 15/08 |

* cited by examiner

SYSTEM AND METHOD FOR CONTINUOUS BALE FORMING

CROSS-REFERENCE TO RELATED APPLICATIONS

This application claims the benefit of U.S. Provisional Patent Application No. 62/165,486, which was filed on May 22, 2015. The entire content of the foregoing provisional patent application is incorporated herein by reference.

TECHNOLOGY FIELD

The present disclosure relates generally to a crop feeding mechanism for a harvester, particularly to a crop feeding mechanism comprising one or more screws or augers for compacting crop material.

BACKGROUND

For many years harvesters, such as agricultural balers, have been used to consolidate and package crop material so as to facilitate the storage and handling of the crop material for later use. Usually, a mower-conditioner cuts and conditions the crop material for windrow drying in the sun. When the cut crop material is properly dried, a harvester, such as a baler, travels along the windrows to pick up the crop material and form it into compact bales.

In a conventional harvester, the cut crop material is gathered at the front of the harvester from along the ground by a pickup assembly, and passed into a crop feeding channel where the material can be further cut before being introduced into a bale-forming chamber. Once there, the processed crop material is formed in a bale of the appropriate shape, and typically the bale forming is terminated according to a diameter or weight criterion.

There are several problems that commonly occur with the conventional crop feeding process. For example, in square balers, one of the most common types of harvesters, crop material is compacted by a piston or plunger which forces the material through a linear bale chamber. Typically, the bale chamber is volumetrically smaller at its exit, such that the crop material is compacted into the appropriate shape as it passes through the bale chamber. This compression can generate excess heat, and if not properly dissipated, this heat can damage the crop material or impede proper functioning of the mechanical components of the baler itself.

The instant application provides a crop feeding mechanism that uses one or more screws or augers in place of a traditional feeding mechanism. Crop material is picked up off the ground and fed into the crop feeding mechanism where the augers compact the crop material as it is moved through a bale chamber.

SUMMARY

The disclosure relates to a baling system comprising: (a) a crop feeder mechanism comprising: an elongated frame extending between a crop collection mechanism and a bale chamber, said elongated frame comprising: a front portion with at least one front opening configured for receiving crop material collected by the crop collection mechanism; a rear portion comprising at least one rear opening configured for extruding crop material from the crop feeder mechanism to the bale chamber; and at least one member mechanically linked to a subframe of a harvester; wherein the front and rear portions of the elongated frame comprise a contiguous internal surface defining a hollowed interior, wherein the contiguous internal surface is substantially tapered in the rear portion such that the hollow interior is continuously decreasing in volume from a frontward to a rearward direction; wherein the crop feeder mechanism comprises at least one auger longitudinally oriented in a frontward to rearward direction and affixed to a rotating axis such that one end of the auger is positioned at or proximate to the at least one rear opening configured for extruding crop material from the crop feeder mechanism to the bale chamber. The disclosure also relates to a baling system comprising: (a) a crop feeder mechanism comprising: an elongated frame extending between a crop collection mechanism and a bale chamber, said elongated frame comprising: a front portion with at least one front opening configured for receiving crop material collected by the crop collection mechanism; a rear portion comprising at least one rear opening configured for extruding crop material from the crop feeder mechanism to the bale chamber; and at least one member mechanically linked to a subframe of a harvester; wherein the front and rear portions of the elongated frame comprise a contiguous internal surface defining a hollowed interior, wherein the contiguous internal surface is substantially tapered in the rear portion such that the hollow interior is continuously decreasing in volume from a frontward to a rearward direction; and (b) a net wrap system positioned rearward of the crop feeder mechanism; wherein the crop collection mechanism is positioned frontward of the crop feeder mechanism; wherein the bale chamber is positioned rearward of the crop feeder mechanism; and wherein the crop feeder mechanism comprises at least one auger longitudinally oriented in a frontward to rearward direction and affixed to a rotating axis such that one end of the auger is positioned at or proximate to the at least one rear opening configured for extruding crop material from the crop feeder mechanism to the bale chamber.

In some embodiments, the crop feeder mechanism comprises two augers, wherein the augers longitudinally oriented in a frontward to rearward direction and affixed to separate rotating axes and the augers are positioned proximate to each other such that threads of the augers define a plurality of spaces into which crop material is fed from the front of the crop feeder mechanism to the rear of the crop feeder mechanism by rotation of the augers along the axes.

In some embodiments, the crop feeder mechanism further comprises a die positioned adjacent to or proximate to the rear opening configured for extruding crop material from the crop feeder mechanism to the bale chamber such that the die defines the shape of extruded crop material as it exits the crop feeder mechanism through the at least one rear opening.

In some embodiments, the hollowed interior of the elongated frame has a conical or substantially conical shape such that the volume of the hollowed interior is defined by increasingly narrow diameters of contiguous internal surface from the frontward to rearward direction; and wherein the at least one auger is longitudinally oriented in a frontward to rearward direction and a rearmost end of the auger is positioned at or proximate to the at least one rear opening such that crop material is compacted as it is fed from the front portion of the crop feeder mechanism to the rearward portion of the crop feeder mechanism.

In some embodiments, the crop feeder mechanism further comprises a drive mechanism operably linked to the end of the at least one auger such that operation of the drive mechanism spins the at least one auger on its rotating axis.

In some embodiments, the front opening of the crop feeder mechanism is positioned on the top of the elongated frame surrounded by funnel shaped sidewalls or substantially funnel shaped side walls that are adapted to receive crop material from the crop collection device and direct the crop material through the at least one front opening.

In some embodiments, the crop feeder mechanism further comprises a temperature control element positioned at or proximate to the at least one rearing opening, the temperature control element comprising a temperature sensor and one or a plurality of heating or cooling members in electronic communication with a controller that monitors the temperature sensor signals and is capable of maintaining a predetermined temperature.

In some embodiments, the one or a plurality of heating or cooling members is in the shape of a collar that is adjacent to or proximate to the rear portion of the elongated frame. In some embodiments, the one or a plurality of heating or cooling members is in the shape of a collar that is adjacent to or proximate to the interior rear portion of the elongated frame.

In some embodiments, the crop feeder mechanism further comprises a controller in electronic communication with a circuit that monitors and adjusts the speed of rotation of the at least one auger.

In some embodiments, the crop feeder mechanism further comprises a first operational mode in which crop material is fed through the front opening and into contact with the at least one auger such that crop material is fed from the crop collection device to the crop feeder mechanism and into contact with the auger, thereby compacting the crop material as it moves in contact with the at least one auger from the front portion of the crop feeder mechanism to the rear portion of the crop feeder mechanism.

In some embodiments, the crop feeder mechanism further comprises a second operational mode in which the direction of the rotation of the at least one auger is reversed such that crop material in contact with the auger is fed from the rear portion of the crop feeding mechanism to the front portion of the crop feeding mechanism.

In some embodiments, the crop feeder mechanism further comprises one or a plurality of sensors positioned at or near the contiguous internal surface of the elongated frame such that the one or plurality of sensors detects a value that corresponds with a mass of crop material at or proximate to the sensor.

In some embodiments, the net wrap system comprises a wrapping mechanism and is positioned immediately behind or proximate to the rear opening, such that twine or a net wrapping material is dispensed from a wrapping mechanism onto crop material as it passes through the rear opening into the bale chamber.

The present disclosure also relates to a harvester comprising the baling system described herein, wherein the harvester comprises a subframe with two oppositely facing sidewalls; wherein the crop feeder mechanism and bale chamber are positioned therebetween; and wherein the at least one member mechanically attaches the crop feeding mechanism to at least one of the two oppositely facing sidewalls. In some embodiments, the harvester is chosen from a round baler, square, baler, combine, or cotton harvester. In some embodiments, the crop collection mechanism comprises a rotary cutter and a pickup assembly positioned in front of the crop feeding mechanism.

In some embodiments, the harvester further comprises at least a first and second operable modes, wherein: in the first operable mode, crop material is fed through the front opening and into contact with the at least one auger such that crop material is fed from the crop collection device to the crop feeder mechanism and into contact with the auger, thereby compacting the crop material as it moves in contact with the auger from the front portion of the crop feeder mechanism to the rear portion of the crop feeder mechanism; and in the second operable mode, the direction of the rotation of the at least one auger is reversed such that crop material in contact with the auger is fed from the rear portion of the crop feeding mechanism to the front portion of the crop feeding mechanism.

The present disclosure also relates to a method of forming a bale in a harvester comprising: feeding material into the crop feeding mechanism described herein; and dispensing wrapping material around crop material that exits the rear opening.

DETAILED DESCRIPTION

Various terms relating to the methods and other aspects of the present invention are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel of the disclosed machinery or mechanism when incorporated into a harvester. "Upward" and "downward" orientations are relative to the ground or operating surface as are any references to "horizontal" or "vertical" planes.

The term "harvester" as used herein is defined as a machine designed to consolidate and/or package material so as to facilitate the storage and handling of the material for later use. In some embodiments, the harvester is used to harvest agricultural material. In some embodiments, the harvester is an agricultural baler, a waste baler, a square baler, a round baler, or a combine comprising a baling mechanism.

The terms "material" or "crop material" as used herein are defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683 A1 that illustrates such mechanisms, the disclosures of which are incorporated herein by reference in their entirety.

The term "bale chamber" as used herein is defined as any space within the harvester that is capable of containing a bale of harvested material. In some embodiments, the sides of the bale chamber are defined by oppositely facing side walls. In some embodiments, the bale chamber is also defined in its front region by an inlet through which harvester material or crop enters. In some embodiments, the front region of a first bale chamber is defined by an inlet or entry point which is in operable connection to any crop feeder mechanism disclosed herein. In some embodiments, the front region of a first bale chamber is defined by an inlet or entry point which is in operable connection to an exit of a crop harvesting assembly. In some embodiments, the bale chamber can be used to form round or square bales of various dimensions. In some embodiments, the bale chamber is positioned rearward from the crop feeder mechanism and comprises a net wrapping mechanism. In some embodiments, the bale chamber comprises a die or a plurality of dies.

The term "die" as used herein is defined as a device or compartment within a device that compresses and/or shapes a bale. In some embodiments, the die is positioned at or proximate to the rear of a crop feeder mechanism. In some embodiments, the die is positioned in a bale chamber. In some embodiments, the die is a plate with an interior space of any shape removed for passage of compacted crop material, such that crop material passing through the die's interior space takes on a three dimensional shape corresponding to the shaped interior space. In some embodiments, the term die refers to a compartment with a hollow or partially hollow space defined by the angles, shape and/or orientation internal surfaces of the compartment and at least one inlet and one outlet through which compacted or compacting crop material is passed or flows. In some embodiments, the die is a hollow object with shaped holes as an inlet or outlet. In some embodiments, the inlet or outlet are the same shape. In some embodiments, the shaped holes are different shapes. In some embodiments, a shaped hole could be a circle, square, triangle or other space through which crop material can be shaped.

The term "net wrapping mechanism" as used herein is defined as a mechanical device or assembly that uses net wrapping material to wrap a formed bale. In some embodiments, the net wrapping mechanism comprises at least one feed roller, a feed plate, at least one compression roller, a cutting knife, and at least one actuator; wherein wrapping material is passed around the at least one feed roller through the feed plate. In some embodiments, the net wrapping mechanism is positioned at or proximate to at least one rear opening of the crop feeder mechanism. In some embodiments, the net wrapping mechanism is optionally positioned on the interior or the exterior of a harvester. In some embodiments, the net wrapping mechanism is positioned within or proximate to the bale chamber but rearward from the outlet of the crop feeder mechanism at a distance from the crop feeder sufficient to allow wrapping material to cover any compacted and/or shaped crop material exiting the die or crop feeder mechanism.

The term "wrapping material" as used herein is defined as a net, mesh, twine, plastic film, or other material that is used for the wrapping of a bale in order to maintain the shape and density of said bale and optionally protect it from weather or other external conditions.

The term "cutting implement" as used herein is defined as a device involved with the cutting of crop material, including one or a plurality of knives, blades, teeth, gears, grinders, scissors, or rotors. In some embodiments, the harvester assembly is equipped with a "rotor cutter" comprising a rotor, a plurality of knife blades attached to one or more knife units, components to support the knife units and allow for the insertion and removal of the knife units within the bottom floor assembly, and a slotted bottom floor through which the knife blades protrude. In some embodiments, the harvester assembly is equipped with a "rotor feeder" comprising a rotor and a solid bottom floor.

The term "bale cutting mechanism" as used herein is defined as a device involved with the cutting of compacted and shaped crop material into individual bales. In some embodiments, the bale cutting mechanism is positioned at or proximate to at least one rear opening of the crop feeder mechanism. In some embodiments, the bale cutting mechanism is positioned at or proximate to at least one net wrapping mechanism. In some embodiments, the bale cutting mechanism is capable of movement, such that it is capable of cutting compacted and shaped crop material into individual bales while said crop material is moving from the rear of the crop feeder mechanism and through a bale chamber.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the disclosure comprise a system comprising a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device. In some embodiments, the operator of the harvester may engage a computer program product stored on a computer-readable medium that provides program code or instructions for maintaining the operation of components of the harvester, systems, or crop feeder mechanism disclosed herein.

In some embodiments, the computer-readable medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a harvester, crop feeder mechanism, or system comprising the crop feeder mechanisms disclosed herein, wherein the harvester, systems, or crop feeder mechanisms comprise a processing system comprising a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the processing system is positioned within the cab of a tractor electronically connected to the harvester, systems, or crop feeder mechanism.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

The term "real-time" and the phrase "in real-time" as used herein are defined as a way of describing a process, event, or action that occurs simultaneously with the process of actively forming a bale in a bale chamber. In some embodiments, various sensors, for example a rotation sensor, continuously sense information about the rotation angle of a bottom floor assembly and transmit that information to a controller in real-time. In some embodiments, an operator may adjust inputted values in an operator interface in real-time. The term "collar" as used herein means any member that is positioned within on or around an exterior to interior surface of the crop collection system. In some embodiments, the collar is a metallic member that is capable of transferring heat to the rear interior portion of the crop collection mechanism or absorbing heat from the rear interior of the crop collection mechanism. In some embodiments, the collar is round, circular, or semi-circular member that is positioned around or proximate to the rear opening (or outlet) and is capable of transferring heat to the rear interior portion of the crop collection mechanism or absorbing heat from the rear interior of the crop collection mechanism.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round or square balers, are well known in the agricultural industry, and the instant invention can be used with substantially any of such machines. Reference is made, for example, to U.S. Pat. Nos. 8,539,787; 8,770,102; 6,877,304; 6,840,023; 6,688,092; 6,651,416; 6,644,006; 6,295,797; and 6,000,206 that illustrate such balers, the disclosures of which are incorporated herein by reference in their entirety. Embodiments of the present invention are particularly well suited, but in no way limited to, use with agricultural balers. The present invention may also find utility in agricultural harvesters including, for example, a waste baler, a cotton harvester, or a combine. In some embodiments, the combine comprises a baling mechanism.

The present disclosure relates to auger crop feeding mechanisms and harvesters comprising auger crop feeding mechanisms. The present disclosure relates to auger crop feeding mechanisms and harvesters comprising auger crop feeding mechanisms that are connected indirectly or directly to a sidewall, subframe or chassis of the harvester by a member or connecting member. Instead of conventional crop compaction systems deployed in square and round balers, an auger crop feeding mechanism takes in loose crop material at one end, and uses one or more augers or screws to push the crop material through a frame that narrows, such that the exit of the frame has a smaller area than the entrance to the frame. This process compacts the crop material into densities suitable for baling. In some embodiments, as crop material is passed out of the auger crop feeding mechanism, it is pushed into a die, where the compacted crop material is shaped, then wrapped for baling by a net wrapping mechanism before being ejected. In some embodiments, the die is similar to a conventional bale chamber, such that it is where compacted crop material takes the shape of a bale and is appropriately wrapped before leaving the harvester.

In some embodiments, the frame of the auger crop feeding mechanism contains spaces, holes, funnels, and/or tubes that allow for air and/or moisture to escape from the crop material during the compaction process. This release of air and/or moisture facilitates the increase in interparticulate contact of the crop material, allowing for more compact bales to be shaped in the die or crop feeder mechanism as the crop material exits the crop feeding mechanism. In some embodiments, the release of air and/or moisture also allows the escape of excess heat that is generated during the crop compaction process. In some embodiments, the excess heat generated during the crop compaction process facilitates the drying of the crop material during compaction.

In some embodiments, the present disclosure relates to a baling system comprising: (a) a crop feeder mechanism comprising: an elongated frame extending between a crop collection mechanism and a bale chamber, said elongated frame comprising: a front portion with at least one front opening configured for receiving crop material collected by the crop collection mechanism; a rear portion comprising at least one rear opening configured for extruding crop material from the crop feeder mechanism to the bale chamber; and at least one member mechanically linked to a subframe of a harvester; wherein the front and rear portions of the elongated frame comprise a contiguous internal surface defining a hollowed interior, wherein the continuous internal surface is substantially tapered in the rear portion such that the hollow interior is continuously decreasing in volume from a frontward to rearward direction; and (b) a net wrap system positioned rearward of the crop feeder mechanism; wherein the crop collection mechanism is positioned frontward of the crop feeder mechanism; wherein the bale chamber is positioned rearward of the crop feeder mechanism; and wherein the crop feeder mechanism comprises at least one auger oriented in a frontward to rearward direction and affixed to a rotating axis such that one end of the auger is positioned at or proximate to the at least one rear opening configured for extruding crop material from the crop feeder mechanism to the bale chamber.

In some embodiments, present disclosure relates to a crop feeder mechanism comprises two augers, wherein the augers oriented in a frontward to rearward direction and affixed to separate rotating axes. The augers are positioned proximate to each other such that threads of the augers define a plurality of spaces into which crop material is pushed from the front of the crop feeder mechanism to the rear of the crop feeder mechanism by rotation of the augers along the axes.

Figure 1:
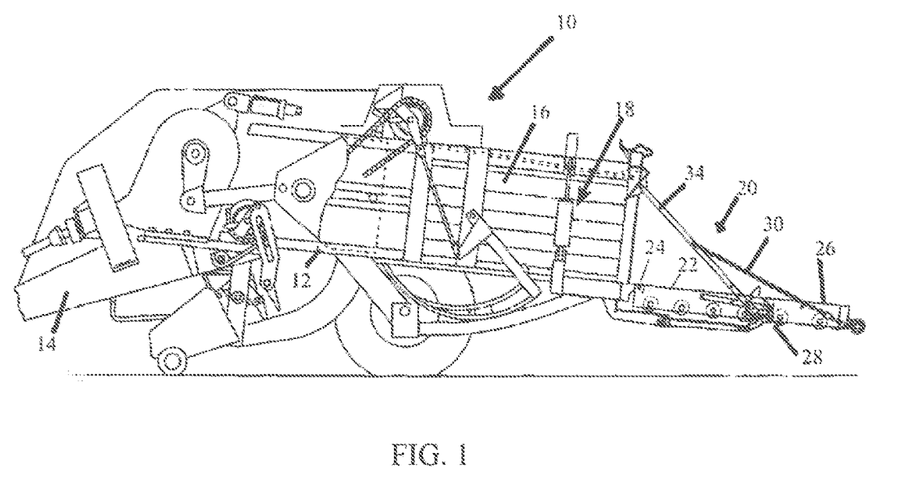
FIG. 1 depicts a static image of a conventional harvester.

Referring to the drawings, FIG. 1 depicts a conventional agricultural baler 10 comprising a frame 12 which is equipped with a biomass feed in the form of a channel 14 that projects forwardly to be hitched to a towing tractor or other vehicle. Square bales are formed and tied in a bale-forming chamber 16 in a conventional manner and the bales are discharged from the rear end of the baling chamber 16 onto a discharge in the form of a chute, generally designated 20.

The chute 20 is formed in two portions, namely a front portion 22 that is pivoted about an axis 24 located at the rear end of the frame 12, and a rear portion 26 that is pivotable relative to the front portion 22 about an axis 28. In the unloaded position, shown in the figures, the bale-supporting surfaces of both portions 22 and 26 are coplanar and inclined at an angle of approximately 6 deg. to the horizontal. If dropped from a height onto the ground, bales can be damaged and the purpose of the pivoting rear portion 26 is to lower the bales more gently onto the ground. When the weight of a bale rests on the rear portion 26 of the bale chute 20, the latter pivots clockwise, as viewed, to lower its trailing end closer to the ground. In this way the bale slides off the rear portion 26 without any risk of the bale toppling. The rear portion 26 of the bale chute is also supported on each side of the baler by a chain 30 connected to an elbow joint between an articulated arm 34.

Figure 2:
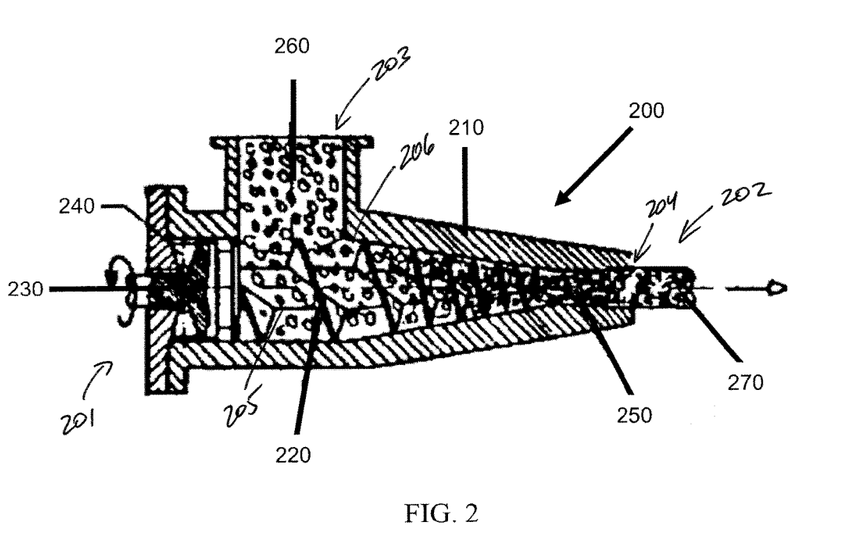
FIG. 2 depicts a cross-section of a crop feeding mechanism with augers.

FIG. 2 depicts a cross-section of a crop feeding mechanism, generally identified as 200, using augers to convey harvester crop material. The crop feeding mechanism 200 is defined by an elongated frame 210 which houses at least one auger 220. Towards the front portion 201 of the frame 210 there is the auger motor and driveshaft, collectively 230, which is sealed in a motor compartment 240 to prevent the introduction of crop material in the motor 230. Towards the rear portion 202 of the frame there is a die 250 that shapes the crop material as it exits from the crop feeding mechanism 200. As loose crop material 260 enters into the crop feeding mechanism 200 through a front opening 203, it is pushed by the at least one rotating auger 220 towards the die 250. The frame 210 reduces in volume as it moves toward the die 250 (e.g., the frame 210 tapers from the front portion 201 towards the rear portion 202 such that the size of the frame 210 opening at the front portion 201 is dimensioned greater than the size of the frame 210 opening at the rear portion 202), such that, as the auger 220 moves the loose crop material 260 toward the die 250, the crop material becomes increasingly compacted. As the crop material reaches the die 250, it is compacted into its final form and is exited out of the crop feeding mechanism 200 through a rear opening 204 in the form of a briquette of dense crop material 270. The auger 220 is longitudinally oriented between the front and rear portions 201, 202, and rotates about a rotating axis 205 within a hollowed interior 206 of the frame 210. In some embodiments, the loose crop material 260 can enter into the crop feeding mechanism 200 in one or a plurality of entrance points located a various positions in the frame 210. In some embodiments, the crop feeding mechanism 200 comprises one or a plurality of augers 220. In the depicted embodiment, the period of oscillation between the blades of the auger 220 on the same longitudinal axis 205 decreases as the blades move toward the die 250, further compacting the crop material as it moves through the crop feeding mechanism 200. In some embodiments, the period of oscillation between the blades of the auger 220 remains the same as the blades move toward the die 250.

Figure 3:
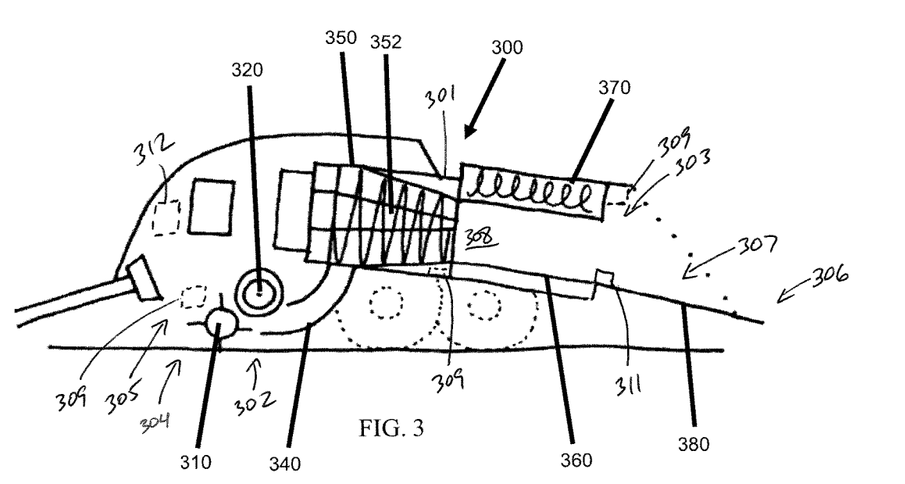
FIG. 3 depicts a cross-section of a harvester comprising a crop feeding mechanism with augers.

FIG. 3 depicts a cross section of a harvester, generally identified as 300, equipped with an auger crop feeding mechanism instead of a conventional crop feeding mechanism found in square balers. The harvester 300 includes an elongated frame 301 extending between a crop collection mechanism 302 (including a pickup assembly 310) and a bale chamber 303. The elongated frame 301 includes a front portion 304 (e.g., a proximal end) with at least one front opening 305 configured for receiving crop material collected by the crop collection mechanism 302. In particular, crop material is taken from the ground and through the opening 305 via the pickup assembly 310 and cut by a cutting implement 320 before being passed into a crop collection channel 340 that extends between the cutting implement 320 and the auger crop feeding mechanism 350. The elongated frame 301 includes a rear portion 306 (e.g., a distal end) with at least one rear opening 307 configured for extruding crop material from the harvester 300. Cut crop material passes into the auger crop feeding mechanism 350, where an auger 352 pushes and compacts the crop material into the die 360. The auger 352 is configured to rotate within the harvester 300 relative to the die 360 and within the housing of the auger crop feeding mechanism 350. The elongated frame 301 defines a contiguous internal hollowed interior 308 extending between the front and rear portions 304, 306 through which the crop material passes. As the compacted and shaped crop material exits the die 360, it is wrapped into a bale by the wrapping mechanism 370 (e.g., a net wrap system, or the like) before being passed out of the harvester 300 and onto the ground via a tailgate 380. The harvester 300 does not have to stop collecting crop material from the ground during the bale ejection process. As one bale is wrapped and ejected, the auger crop feeding mechanism 350 continues to push out compacted crop material into the die 360. In the depicted embodiment, the die 360 can shape the compacted crop material into round or square shaped bales. In some embodiments, the die 360 is similar in dimension to a bale chamber from a conventional square baler. In some embodiments, the harvester 300 can include one or more sensors 309 disposed within the frame 301 (e.g., at or near the front opening 305, at or near the rear opening 307, within the hollowed interior 308, combinations thereof, or the like). The sensors 309 can measure characteristics, such as temperature, mass of the crop material, at different sections of the frame 301. The harvester 300 can include one or more heating or cooling members 311 disposed at or near the interior surface of the rear portion 306 of the frame 301. The sensors 309 and the heating or cooling members 311 can be in electronic communication with a controller 312. Based on the characteristics detected by the sensors 309, the controller 312 can, e.g., control operation of the heating or cooling members 311 to maintain a predetermined temperature within the frame 301, adjust the rotational speed of the auger 352, or the like. In some embodiments, a bale cutting mechanism separates the bale from the rest of the compacted crop material either before or after the bale has been wrapped. In some embodiments, the bale cutting mechanism is capable of movement relative to the die 360, such that as compacted crop material continues to pass through the die 360, the bale cutting mechanism can move with the compacted crop material while cutting. In some embodiments, the bale cutting mechanism can cut bales of varying length. In some embodiments, the auger crop feeding mechanism 350 contains two or more augers. In some embodiments, the auger crop feeding mechanism 350 contains two or more augers, each auger having the same or different distances between blades on the longitudinal axis of the device, such that the number of blades on a given distance along the longitudinal axis of the auger many increase, decrease or remain constant from the frontward to rearward direction.

Figure 4:
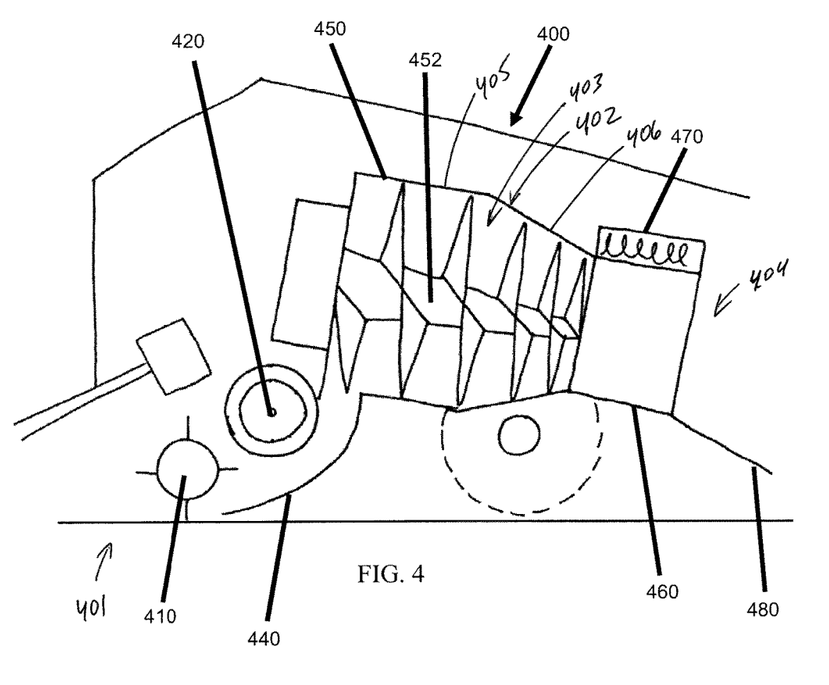
FIG. 4 depicts a cross-section of another type of harvester comprising a crop feeding mechanism with augers.

FIG. 4 depicts a cross section of a harvester, generally identified as 400, equipped with an auger crop feeding mechanism instead of a conventional belt driven bale chamber found in round balers. Crop material is taken from the ground via a pickup assembly 410 at a front portion 401 of the harvester 400 and cut by a cutting implement 420 before being passed into a crop collection channel 440 that extends between the cutting implement 420 and the auger crop feeding mechanism 450. Cut crop material then passes into the auger crop feeding mechanism 450, where an auger 452 pushes the crop material through a narrowing frame 402, compacting the crop material as it is pushed into the die 460. The auger 452 is configured to rotate within a hollowed interior 403 of the harvester 400 relative to the die 460 and within the housing of the auger crop feeding mechanism 450. The narrowing frame 402 can narrow or taper gradually from a front portion towards a rear portion. In some embodiments, the narrowing frame 402 can include a first portion 405 extending from the front portion and defining a uniform size or diameter, and a second portion 406 extending from the first portion 405 towards the rear portion and defining a narrowing or tapered configuration (e.g., a first non-tapered section and a second tapered section). Thus, the blades of the auger 452 can define the same diameter at the first portion 405 and can taper within the second portion 406. For example, some of the blades of the auger 452 (e.g., half) define the same diameter, while the remaining blades of the auger 452 define a tapering diameter. As the compacted and shaped crop material exits the die 460 at a rear portion 404 of the harvester 400, it is wrapped into a bale by the wrapping mechanism 470 (e.g., a net wrap system, or the like) before being passed out of the harvester 400 and onto the ground via a tailgate 480. The harvester 400 does not have to stop collecting crop material from the ground during the bale ejection process. As one bale is wrapped and ejected, the auger crop feeding mechanism 450 continues to push out compacted from material into the die 460. In the depicted embodiment, the die 460 can shape the compacted crop material into round or square shaped bales. In some embodiments, the die 460 is similar in dimension to a bale chamber from a conventional round baler. In some embodiments, a cutting mechanism separates the bale from the rest of the compacted crop material either before or after the bale has been wrapped. In some embodiments, a bale cutting mechanism separates the bale from the rest of the compacted crop material either before or after the bale has been wrapped. In some embodiments, the bale cutting mechanism is capable of movement relative to the die 460, such that as compacted crop material continues to pass through the die 460, the bale cutting mechanism can move with the compacted crop material while cutting. In some embodiments, the bale cutting mechanism can cut bales of varying length. In some embodiments, the auger crop feeding mechanism 450 contains more than one auger.

Figure 5:
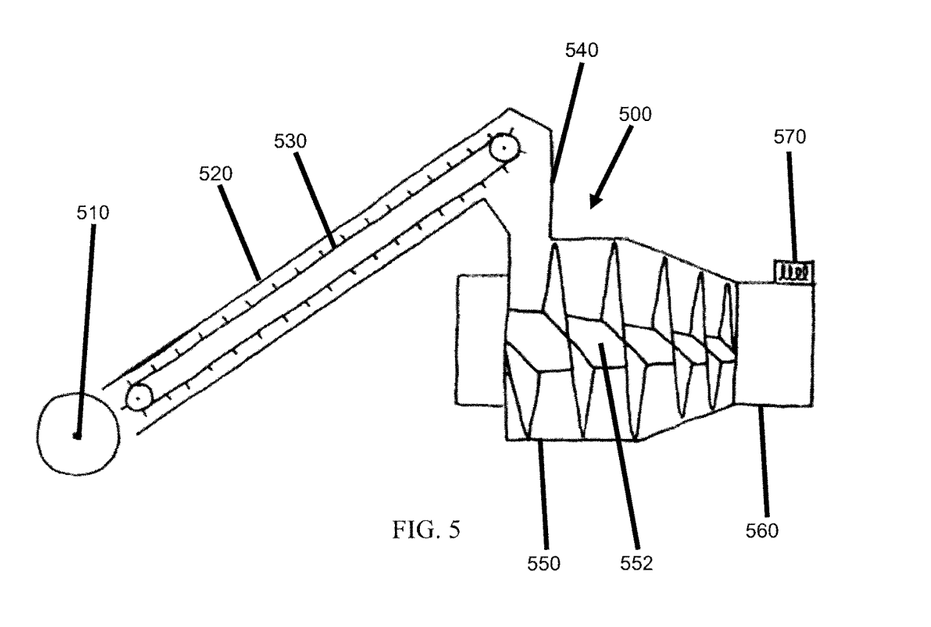
FIG. 5 depicts a cross-section of a type of harvester comprising a crop feeding mechanism with augers.

FIG. 5 depicts a cross section of system with an auger crop feeding mechanism and a combine crop pickup assembly, generally identified as 500. Crop material is taken from the ground via a combine crop pickup assembly 510 and lifted into a shaft 520 containing a conveyor belt 530. The shaft 520 extends between the combine crop pickup assembly 510 and a crop feeding mechanism 550. Crop material is moved up the shaft 520 by the conveyor belt 530, and then dropped into an opening of the crop feeding mechanism 550. Once inside the frame of the crop feeding mechanism 550, an auger 552 pushes the crop material through a narrowing frame of the mechanism, compacting the crop material as it is pushed into the die 560. The auger 552 is configured to rotate within the system 500 relative to the die 560 and within the housing of the crop feeding mechanism 550. As the compacted and shaped crop material exits the die 560, it is wrapped into a bale by the wrapping mechanism 570 before being ejected. The system 500 does not have to stop operation or collection of crop material from the ground during the bale ejection process. As one bale is wrapped and ejected, the auger crop feeding mechanism 550 continues to push out compacted from material into the die 560. In the depicted embodiment, the die 560 can shape the compacted crop material into round or square shaped bales. In some embodiments, the system 500 can be operably linked to a combine (e.g., via one or more combine crop pickup assemblies 510). In some embodiments, the system 500 can be fed crop material by a plurality of combine crop pickup assemblies 510. In some embodiments, the one or a plurality of combine crop pickup assemblies 510, shafts 520, and conveyor belts 530 can be operably associated with one or a plurality of combines or harvesters, while the auger crop feeding mechanism 550, die 560, and wrapping mechanism 570 can be operably associated with a separate harvester or baler. In some embodiments, a cutting mechanism separates the bale from the rest of the compacted crop material either before or after the bale has been wrapped. In some embodiments, a bale cutting mechanism separates the bale from the rest of the compacted crop material either before or after the bale has been wrapped. In some embodiments, the bale cutting mechanism is capable of movement relative to the die 560, such that as compacted crop material continues to pass through the die 560, the bale cutting mechanism can move with the compacted crop material while cutting. In some embodiments, the bale cutting mechanism can cut bales of varying length. In some embodiments, the auger crop feeding mechanism 550 contains more than one auger.

In some embodiments, the harvester and systems disclosed herein comprise a controller that operates and is in electronic communication with a set of hydraulic cylinders. In some embodiments, the harvester and systems disclosed herein comprise a controller that operates and is in electronic communication with one or a plurality of sensors that detect the temperature levels and/or position of size of the bale within the bale chamber and/or crop feeding mechanism. In some embodiments, the harvester and systems disclosed herein comprise a controller that operates and is in electronic communication with one or a plurality of independently addressable or engageable elements that heat or cool the surface or air around in the vicinity around the elements. In some embodiments, the harvester and systems disclosed herein comprise a controller that operates and is in electronic communication with one or a plurality of independently addressable or engageable elements that heat or cool the surface or air around in the vicinity around the elements and that are positioned within, around or at or proximate to the crop feeding mechanism. In some embodiments, any of the harvesters disclosed herein comprise a bale chamber that receives compacted crop mater from the crop feeder mechanism, wherein the bale chamber comprises one or a plurality of cutting implements that are capable of cutting a bale contained within the bale chamber before evacuation of the bale from of the harvester. Such cutting implements may be movable within the bale chamber or stationary and may be preset or programmable (if electronically connected to a controller accessible and programmable by the operator) to cut wrapped bale in any size or length before evacuation of the bale from of the harvester. Such cutting implements may be movable within the bale chamber or stationary and may be preset or programmable (if electronically connected to a controller accessible and programmable by the operator) to cut wrapped bale in a standard size, and/or increasingly larger and/or decreasingly small size during operation. In some embodiments, the cutting implements may move from a position in the bale chamber at or proximate to the net wrap mechanism to the most rearward outlet of harvester. In some embodiments, the cutting implements are stationary at a position in the bale chamber at or proximate to the rearward outlet of harvester.

Having described a series of embodiments, it will become apparent that various modifications can be made without departing from the scope of the invention as defined in the accompanying claims. Various publications, including patents, published applications, technical articles and scholarly articles are cited throughout the specification. Each of these cited publications is incorporated by reference herein, in its entirety.

What is claimed is:

1. A baling system comprising:
    (a) a crop feeder mechanism comprising an elongated frame extending between a crop collection mechanism and a bale chamber, said elongated frame comprising:
        a front portion with at least one front opening configured for receiving crop material collected by the crop collection mechanism;
        a rear portion comprising at least one rear opening configured for extruding crop material from the crop feeder mechanism to the bale chamber; and
        at least one member mechanically linked to a subframe of a harvester;
    wherein the front and rear portions of the elongated frame comprise a contiguous internal surface defining a hollowed interior;
    wherein the continuous internal surface is substantially tapered in the rear portion such that the hollow interior is continuously decreasing in volume from a frontward to rearward direction; and
    (b) a net wrap system positioned rearward of the crop feeder mechanism;
    wherein the crop collection mechanism is positioned frontward of the crop feeder mechanism;
    wherein the bale chamber is positioned rearward of the crop feeder mechanism;
    wherein the crop feeder mechanism comprises at least one auger longitudinally oriented in a frontward to rearward direction and affixed to a rotating axis such that one end of the auger is positioned at or proximate to the at least one rear opening configured for extruding crop material from the crop feeder mechanism to the bale chamber; and
    wherein the crop feeder mechanism comprises a temperature control element positioned at or proximate to the at least one rear opening.

2. The baling system of claim 1, wherein the crop feeder mechanism comprises two augers, wherein the augers longitudinally oriented in a frontward to rearward direction and affixed to separate rotating axes and the augers are positioned proximate to each other such that threads of the augers define a plurality of spaces into which crop material is fed from the front of the crop feeder mechanism to the rear of the crop feeder mechanism by rotation of the augers along the axes.

3. The baling system of claim 1, wherein the crop feeder mechanism further comprises a die positioned adjacent to or proximate to the one opening configured for extruding crop material from the crop feeder mechanism to the bale chamber such that the die defines the shape of extruded crop material as it exits the crop feeder mechanism through the at least one rear opening.

4. The baling system of claim 1, wherein the hollowed interior of the elongated frame has a conical or substantially conical shape such that the volume of the hollowed interior is defined by increasingly narrow diameters of contiguous internal surface from the frontward to rearward direction; and wherein the at least one auger is longitudinally oriented in a frontward to rearward direction and a rearmost end of the auger is positioned at or proximate to the at least one rear opening such that crop material is compacted as it is fed from the front portion of the crop feeder mechanism to the rearward portion of the crop feeder mechanism.

5. The baling system of claim 1, wherein the crop feeder mechanism further comprises a drive mechanism operably linked to the end of the at least one auger such that operation of the drive mechanism spins the at least one auger on its rotating axis.

6. The baling system of claim 1, wherein the front opening of the crop feeder mechanism is positioned on the top of the elongated frame surrounded by funnel shaped sidewalls or substantially funnel shaped side walls that are adapted to receive crop material from the crop collection device and direct the crop material through the at least one front opening.

7. The baling system of claim 1, wherein the temperature control element comprises a temperature sensor and one or a plurality of heating or cooling members in electronic communication with a controller that monitors the temperature sensor signals and is capable of maintaining a predetermined temperature.

8. The baling system of claim 7, wherein the one or a plurality of heating or cooling members comprise a collar defining a round, circular, or semi-circular member that is positioned adjacent to or proximate to the interior surface of rear portion of the elongated frame.

9. The baling system of claim 1, wherein the crop feeder mechanism further comprises a controller in electronic communication with a circuit that monitors and adjusts the speed of rotation of the at least one auger.

10. The baling system of claim 9, wherein the crop feeder mechanism further comprises a first operational mode in which crop material is fed through the front opening and into contact with the at least one auger such that crop material is fed from the crop collection device to the crop feeder mechanism and into contact with the auger, thereby compacting the crop material as it moves in contact with the at least one auger from the front portion of the crop feeder mechanism to the rear portion of the crop feeder mechanism.

11. The baling system of claim 10, wherein the crop feeder mechanism further comprises a second operational mode in which the direction of the rotation of the at least one auger is reversed such that crop material in contact with the auger is fed from the rear portion of the crop feeding mechanism to the front portion of the crop feeding mechanism.

12. The baling system of claim 10, wherein the crop feeder mechanism further comprises one or a plurality of sensors positioned at or near the contiguous internal surface of the elongated frame such that the one or plurality of sensors detects a value that corresponds with a mass of crop material at or proximate to the sensor.

13. The baling system of claim 1, wherein the net wrap system comprises a wrapping mechanism and is positioned immediately behind or proximate to the rear opening, such that twine or a net wrapping material is dispensed from a wrapping mechanism onto crop material as it passes through the rear opening into the bale chamber.

14. A harvester comprising the baling system of claim 1, wherein the baler comprises a subframe with two oppositely facing sidewalls; wherein the crop feeder mechanism and bale chamber are positioned therebetween; and wherein the at least one member mechanically attaches the crop feeding mechanism to at least one of the two oppositely facing sidewalls.

15. The harvester of claim 14, wherein the harvester is chosen from a round baler, square baler, combine, or cotton harvester.

16. The harvester of claim 14, wherein the crop collection mechanism comprises a rotary cutter and a pickup assembly positioned in front of the crop feeding mechanism.

17. The harvester of claim 14, further comprising at least a first and second operable modes, wherein:
in the first operable mode, crop material is fed through the front opening and into contact with the at least one auger such that crop material is fed from the crop collection device to the crop feeder mechanism and into contact with the auger, thereby compacting the crop material as it moves in contact with the at least one auger from the front portion of the crop feeder mechanism to the rear portion of the crop feeder mechanism; and
in the second operable mode, the direction of the rotation of the at least one auger is reversed such that crop material in contact with the auger is fed from the rear portion of the crop feeding mechanism to the front portion of the crop feeding mechanism.

18. A method of forming a bale in a harvester comprising:
feeding material into the crop feeding mechanism of claim 1; and
dispensing wrapping material around crop material that exits the rear opening.

19. A baling system comprising:
a crop feeder mechanism comprising an elongated frame extending between a crop collection mechanism and a bale chamber, said elongated frame comprising:
a front portion with at least one front opening configured for receiving crop material collected by the crop collection mechanism;
a rear portion comprising at least one rear opening configured for extruding crop material from the crop feeder mechanism to the bale chamber; and
at least one member mechanically linked to a subframe of a harvester;
wherein the front and rear portions of the elongated frame comprise a contiguous internal surface defining a hollowed interior;
wherein the continuous internal surface is substantially tapered in the rear portion such that the hollow interior is continuously decreasing in volume from a frontward to rearward direction; and
wherein the crop feeder mechanism comprises a temperature control element positioned at or proximate to the at least one rear opening.

* * * * *